US00RE41985E

(19) United States
(12) Reissued Patent
Ide et al.

(10) Patent Number: US RE41,985 E
(45) Date of Reissued Patent: Dec. 7, 2010

(54) GLOSS-IMPARTING DEVICE AND COLOR IMAGE-FORMING APPARATUS

(75) Inventors: Osamu Ide, Ashigarakami-gun (JP); Yu Tsuda, Ashigarakami-gun (JP)

(73) Assignee: Fuji Xerox Co., Ltd., Tokyo (JP)

(21) Appl. No.: 12/314,441

(22) Filed: Dec. 10, 2008

Related U.S. Patent Documents

Reissue of:
(64) Patent No.: 7,321,449
Issued: Jan. 22, 2008
Appl. No.: 11/653,265
Filed: Jan. 16, 2007

U.S. Applications:

(63) Continuation of application No. 10/141,853, filed on May 10, 2002, now Pat. No. 7,180,631.

(30) Foreign Application Priority Data

May 11, 2001 (JP) ..... 2001-142223

(51) Int. Cl.
*G06K 15/00* (2006.01)
*B41M 5/40* (2006.01)

(52) U.S. Cl. ..... 358/1.9; 358/2.1; 428/32.33

(58) Field of Classification Search ..... 430/138, 430/45; 427/359; 428/195, 32.23, 195.1; 399/39; 358/1.9, 2.1
See application file for complete search history.

(56) References Cited

U.S. PATENT DOCUMENTS 4,859,561 A * 8/1989 Metz et al. ..... 430/138
5,126,221 A * 6/1992 Chiba et al. ..... 430/45.51

(Continued)

FOREIGN PATENT DOCUMENTS

| | | | |
|---|---|---|---|
| EP | 0349227 A2 | | 1/1990 |
| EP | 0349227 | * | 1/1990 |
| JP | A 63-58374 | | 3/1988 |
| JP | A 63-259575 | | 10/1988 |
| JP | A 3-2765 | | 1/1991 |
| JP | A 03-267955 | | 11/1991 |
| JP | A 4-204670 | | 7/1992 |
| JP | A 4-278967 | | 10/1992 |
| JP | A 5-142963 | | 6/1993 |
| JP | A 5-158364 | | 6/1993 |
| JP | A 5-232840 | | 9/1993 |
| JP | A 7-72696 | | 3/1995 |
| JP | A 10-319755 | | 12/1998 |
| JP | 09159020 | | 1/1999 |
| JP | A-09-159020 | | 1/1999 |
| JP | A 11-202583 | | 7/1999 |
| JP | A 2000-147863 | | 5/2000 |

OTHER PUBLICATIONS

U.S. Pat. No. 5,032,440 , withdrawn.
U.S. Patent No. 5,009,945, withdrawn.

* cited by examiner

*Primary Examiner*—Jerome Grant, II
(74) *Attorney, Agent, or Firm*—Oliff & Berridge, PLC

(57) ABSTRACT

A gloss-imparting device for imparting a gloss on a color image, the gloss-imparting device has a transparent toner image-carrying body, a transparent toner image-forming unit, a heating/pressurizing unit, and a cooling/releasing unit. The transparent toner image-carrying body carries a transparent toner image formed of a transparent toner thereon. The transparent toner image-forming unit forms the transparent toner image on the transparent toner image-carrying body. The heating/pressurizing unit heats and pressurizes the transparent toner image and the base material to bring them into contact. The cooling/releasing unit cools the transparent toner image and releases the base material from the transparent toner image-carrying body. The transparent toner image is transferred and fixed onto the base material by the heating/pressurizing unit.

5 Claims, 5 Drawing Sheets

U.S. PATENT DOCUMENTS 5,206,101 A * 4/1993 Schonenberg ..... 430/45.5
5,229,188 A * 7/1993 Takeuchi et al. ..... 428/195.1
5,309,210 A * 5/1994 Yamamoto et al. ..... 399/329
5,506,671 A * 4/1996 Buts et al. ..... 399/39
5,629,259 A * 5/1997 Akada et al. ..... 503/227
5,759,727 A * 6/1998 Malhotra ..... 430/97
5,780,191 A * 7/1998 Ide ..... 430/45.1
5,795,695 A 8/1998 Malhotra et al.
5,826,146 A * 10/1998 Maruta et al. ..... 399/235
5,845,575 A 12/1998 Eda et al.
5,918,092 A * 6/1999 Hama ..... 399/227
5,991,589 A * 11/1999 Thompson et al. ..... 399/297
6,044,204 A * 3/2000 Takamatsu et al. ..... 358/1.9
6,104,890 A * 8/2000 Kim ..... 399/46
6,150,062 A 11/2000 Sugizaki et al.
6,366,746 B1 * 4/2002 Sasago et al. ..... 399/90
6,403,159 B1 6/2002 Lim
6,516,163 B2 * 2/2003 Nakai et al. ..... 399/49
6,652,087 B2 11/2003 Furukawa
6,654,040 B2 11/2003 Kasperchik et al.
2001/0031343 A1 10/2001 Takabe et al.
2001/0055670 A1 12/2001 Ogura
2002/0167681 A1 11/2002 Ide et al.
2003/0012576 A1 * 1/2003 Owen et al. ..... 399/27
2003/0096183 A1 5/2003 Katoh et al.

FIG. 7

| | EMBODIMENT 1 | EMBODIMENT 2 | EMBODIMENT 3 | COMPARATIVE EXAMPLE 1 | COMPARATIVE EXAMPLE 2 |
|---|---|---|---|---|---|
| SMOOTHNESS | ○ | △ | ○ | × | × |
| DIFFERENCE OF GLOSSINESS | △ | △ | ○ | × | ○ |
| RESULT OF SUBJECTIVE EVALUATION | ○ | ○ | ○ | × | △ |

GLOSS-IMPARTING DEVICE AND COLOR IMAGE-FORMING APPARATUS

Matter enclosed in heavy brackets [ ] appears in the original patent but forms no part of this reissue specification; matter printed in italics indicates the additions made by reissue.

This is a Continuation of application Ser. No. 10/141,853 filed May 10, 2002 now U.S. Pat. No. 7,180,681. The disclosure of the prior application is hereby incorporated by reference herein in its entirety.

BACKGROUND OF THE INVENTION

1. Field of the Invention

The present invention relates to a color image-forming apparatus for forming a color image by electrophotography, electrostatic recording, or the like and, more particularly, a color image-forming apparatus capable of forming color images with a high gloss.

2. Description of the Related Art

In the related art, in the color image-forming apparatus of this type for forming color images by electrophotography, electrostatic recording, or the like, if the color image is formed on a base material, for example, if the color copy is taken, the following image forming steps are carried out. That is, light is irradiated onto a color document, then the reflected-light image is read and color-separated by a color scanner, then predetermined image processing and color correction are applied by an image processing device, then the semiconductor laser or the like is modulated based on the resultant image signal of plural colors to emit a laser beam from the semiconductor laser or the like modulated in response to the image signal. A plurality of electrostatic latent images are formed by irradiating the laser beam onto an inorganic photoreceptor made of Se, amorphous silicon, or the like or an organic photoreceptor, which employs phthalocyanine pigment, bis-azo pigment, or the like as the charge generating layer, plural times color by color. A plurality of electrostatic latent images formed on the inorganic or organic photoreceptor are developed sequentially by four-color toners consisting of yellow (Y), magenta (M), cyan (C), and black (K), for example. Then, the formation of the color image on the base material is carried out by transferring the developed toner image from the inorganic or organic photoreceptor to the base material such as paper and then heating/fixing the image by a fixing device such as a thermally-fixing roller, or the like.

The color toner employed in such color image-forming apparatus is fabricated by adhering the fine grains, which have an average diameter of about 5 to 100 nm, onto the particles, which have an average particle diameter of 1 to 15 μm. For example, such fine grains are inorganic fine grains made of silicon oxide, titanium oxide, aluminum oxide, etc. or finely divided resins made of PMMA, PVDF, etc. For example, such particles are prepared by dispersing a coloring agent into a binding resin that are formed of polyester resin, styrene/acryl copolymer, styrene/butadiene copolymer, or the like. Also, for example, the above coloring agents are benzidine yellow, quinoline yellow, Hansa yellow, etc. for the yellow (Y) toner, Rhodamine B, rose Bengal, pigment red, etc. for the magenta (M) toner, phthalocyanine blue, aniline blue, pigment blue, etc. for the cyans (C) toner, and carbon black, aniline black, blend of color pigments for the black (K) toner.

The surface of the color image has a gloss to some extent since such surface of the color image being formed of the above color toner is smoothed in heating/fixing, while normally the surface of the paper does not have a gloss. Thus, the color image has a glossiness that is different from the surface of the paper. Also, it is known that the viscosity of the toner is changed in heating/fixing according to type of a binding resin used in the color toner, the heating/fixing system, etc. and thus the glossiness of the color image is changed.

Meanwhile, the taste in glossiness of the color image is different according to the type of the image, the purpose in use, etc., and a variety of tastes in glossiness are present. In the case of a photographic print such as a portrait, a scenery, etc., normally there is a tendency that an image with a high gloss is preferred from the viewpoint of getting the vivid and crisp image.

Therefore, in the color image-forming apparatus, the technologies disclosed in JP-A-Hei.5-142963, JP-A-Hei.3-2765, JP-A-Sho.63-259575, etc., for example, have already been proposed as the technology for preparing images with a high gloss. The effect such that the image with a high gloss can be obtained by employing a color copying machine and selecting the material of the toner, the fixing conditions, etc. is set forth in these Publications.

However, in the case of the technologies disclosed in these Publications, the glossiness of the image portion made of the toner can be enhanced. Nevertheless, these technologies have problems that the glossiness of the non-image portion cannot be increased higher and also that the glossiness on the base material cannot be made uniform. Also, the unevenness of the color toner remains on the surface of the image, and thus the color image does not become smooth unlike silver halide photographic prints or printed matters. Therefore, these technologies have the problem that a sufficiently smooth appearance cannot be obtained.

Therefore, in order to deal with the above problems, in JP-A-Sho.63-58374, JP-A-Hei.4-278967, JP-A-Hei.4-204670, JP-A-Hei.5-232840, JP-A-Hei.7-72696, etc., for example, the device for transferring/fixing transparent toner as well as color toners onto the base material has been proposed.

However, in the case of the apparatus according to these proposals, since the transparent toner image is formed on the based material, a total amount of the transfer toner consisting of the color toner and the transparent toner is increased and thus the good transfer efficiency cannot be obtained. Therefore, not only the smooth image cannot be obtained, but also the unevenness of the image remains because the color toner is developed. As a result, these technologies have the problem that the smooth image of high surface uniformity cannot be obtained.

Also, as disclosed in JP-A-Hei.11-202583, in order to develop the transparent toner between screen lines comprising color toners, a technique has already been proposed that the image signals for developing the transparent toner are set to be inserted into the clearances between the pixels of the color toner.

However, actually it is difficult to develop the transparent toner in the clearances between the pixels of the color toner due to speed variation of a photoreceptor, speed variation, expansion, and contraction/meandering of an intermediate transfer material and a base material etc. Therefore, this technique has the problem that the image surface structure is not smooth and that, due to poor surface smoothness, images similar to silver halide photographic and lithographic ones, which have a highly uniform appearance cannot be obtained.

In addition, in JP-A-Hei.5-158364, the apparatus that can form the image with high gloss, such as the silver photography by heating/melting the base material, on which the color toner image and the transparent toner image are formed, by the belt-type fixing device and then cooling/releasing the base material is disclosed.

However, in the case of this apparatus, there is the problem that the height difference becomes prominent at the boundary between a high density portion and a low density portion, and especially a small low density spot in the high density portion becomes hollow such that a pit is opened. This phenomenon becomes prominent when speed of a base material passing through a fixing device is enhanced. Thus, this apparatus has the problem that it is impossible to achieve both of the high printing speed and the highly glossy uniform image.

Therefore, the present invention has been made to overcome the problems in the related art. It is an object of the present invention to provide a gloss-imparting device capable of forming an image, whose surface is smooth over an entire area of the image and which has a high gloss independent of the image density, at a high speed not to make height difference at a boundary between a high density portion and a low density portion prominent, and a color image-forming apparatus using the same.

SUMMARY OF THE INVENTION

According to a first aspect of the invention, there is provided a gloss-imparting device for imparting a gloss on a color image, the gloss-imparting device having a transparent toner image-carrying body, a transparent toner image-forming unit, a heating/pressurizing unit, and a cooling/releasing unit. The transparent toner image-carrying body carries a transparent toner image formed of a transparent toner thereon. The transparent toner image-forming unit forms a transparent toner image on the transparent toner image-carrying body. The heating/pressurizing unit heats and pressurizes the transparent toner image and the base material to bring them into contact. The cooling/releasing unit cools the transparent toner image and releases the base material from the transparent toner image-carrying body. The transparent toner image is transferred and fixed onto the base material by the heating/pressurizing unit.

According to a second aspect of the invention, there is provided a color image-forming apparatus for forming a color image with a gloss, the color image-forming apparatus having a color image-forming unit for forming a color image on a base material, a transparent toner image-carrying body for carrying a transparent toner image formed of a transparent toner thereon, a transparent toner image-forming unit for forming the transparent toner image on the transparent toner image-carrying body, a heating/pressurizing unit for heating and pressurizing the transparent toner image, which is formed on the transparent toner image-carrying body, and the base material, on which the color image is formed by the color image-forming unit, to bring the transparent toner image and the base material into contact, and the cooling/releasing unit for cooling the transparent toner image, which is heated/pressured by the heating/pressurizing unit, and then releasing the base material, on which the transparent toner image and the color image are formed, from the transparent toner image-carrying body. The transparent toner image formed on the transparent toner image-carrying body is transferred and fixed onto the base material by the heating/pressurizing unit.

According to a third aspect of the invention, there is provided a color image-forming apparatus according to the second aspect, in which the color image formed by the color image-forming unit is an unfixed toner image, which is formed by color toners including at least a thermoplastic resin.

According to a fourth aspect of the invention, there is provided a color image-forming apparatus according to the second aspect in which the color image-forming unit has a heating/fixing unit for melting/fixing a toner image onto the base material and the color image formed by the color image-forming unit is a toner image, which is formed by color toners including at least a thermoplastic resin, melted/fixed onto the base material by the heating/fixing unit.

According to a fifth aspect of the invention, there is provided a color image-forming apparatus according to the second aspect, in which the transparent toner image-forming unit includes a photoreceptor, a charging device for charging the photoreceptor, facing the photoreceptor, an exposing device for exposing the photoreceptor to form an electrostatic latent image on the photoreceptor, a signal forming device for controlling an area in which a transparent toner image is formed on the color image formed by the color image-forming unit, a transparent toner image-developing device for developing the electrostatic latent image on the photoreceptor to form a transparent toner image on the photoreceptor, the transparent toner image-developing device facing the photoreceptor, and a transferring device for transferring the transparent toner image formed on the photoreceptor onto the transparent toner image-carrying body.

According to a sixth aspect of the invention, there is provided a color image-forming apparatus according to the second aspect, in which a surface of the transparent toner image-carrying body is coated with a silicon rubber.

According to a seventh aspect of the invention, there is provided a color image-forming apparatus according to the second aspect, in which a surface of the transparent toner image-carrying body is coated with a liquid fluoroelastomer.

According to an eighth aspect of the invention, there is provided a color image-forming apparatus according to the second aspect, in which the transparent toner includes at least a thermoplastic resin having a weight-average molecular weight in a range of from 5,000 to 40,000 and a glass transition point of not lower than 55° C. and lower than 75° C., and a wax whose melting point is in the range of from 80° C. to 110° C. at a content between 2 and 8 wt %.

According to a ninth aspect of the invention, there is provided a color image-forming apparatus according to the fifth aspect, in which when the toner developing device develops the electrostatic latent image, a temperature of the transparent toner image-carrying body is less than 60° C. at a position thereon to which the transparent toner developing device is opposed.

BRIEF DESCRIPTION OF THE DRAWINGS

Exemplary embodiments will be described with reference to the drawings, in which like reference numerals represent like parts, and wherein:

FIG. 7 summarizes the evaluation results for the prints prepared by the embodiments and comparative examples.

DETAILED DESCRIPTION OF THE PREFERRED EMBODIMENTS

Embodiments of the present invention will be explained with reference to the drawings hereinafter.

Embodiment 1

This color image-forming apparatus is constructed to form a color image on a base material and form a glossy color image by transferring/fixing a transparent toner image onto the base material on which the color image is formed, and to have at least a transparent toner image-carrying body for carrying a transparent toner image thereon; a transparent toner image-forming unit for forming the transparent toner image on the transparent toner image-carrying body; a heating/pressurizing unit for heating and pressurizing the transparent toner image, which is formed on the transparent toner image-carrying body, and the base material on which the color image is formed, to bring into contact; and a cooling/releasing unit for cooling the transparent toner image, that is transferred/fixed on to the base material, and then releasing the base material, on which the transparent toner image and the color image are formed, from the transparent toner image-carrying body.

As a base material on which the color image is formed, the paper or the plastic film onto which the color toner image is transferred, paper on which an image is printed by the ink jet, the offset printed matter such as a catalog, a handbill, etc. for example, may be used. Any color image formed by any well-known image forming apparatus may be employed, so long as the color image is formed on a base material.

When a thermoplastic toner image is formed on a paper or a plastic film, particularly preferable result can be obtained using the color image-forming apparatus according to the invention. The toner image may be an unfixed image or may be an image formed by melting/fixing a toner by a heating/fixing device.

Also, a unit for forming the color toner image on the base material may be a color image-forming apparatus based on well-known electrophotographic processes or the like.

Figure 1:
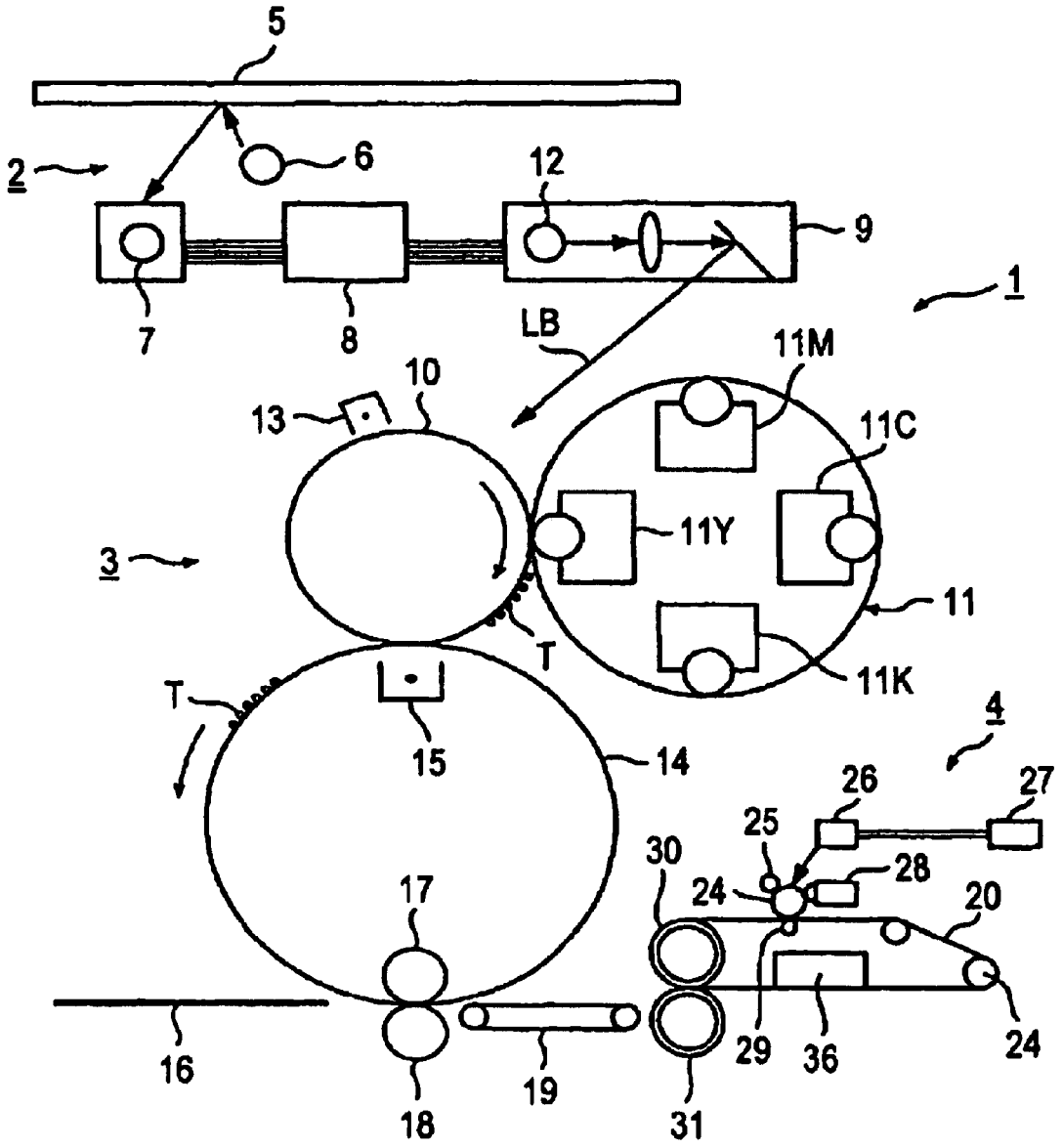
FIG. 1 is a cross-sectional view showing a color image-forming apparatus to which a gloss-imparting device according to an embodiment 1 of the present invention is applied.

FIG. 1 is a cross-sectional view showing a color image-forming apparatus to which a gloss-imparting device according to the embodiment 1 of the present invention is applied.

Roughly classified, this color image-forming apparatus 1 has a scanning device 2 for reading and digitalizing a color original, an image outputting device 3 for outputting an image based on the color image that is read by the scanning device 2 or image data that is sent from a personal computer (not shown) or the like, and a gloss-imparting device 4 for imparting a gloss on a base material on which the color image output from the image outputting device 3 is formed or a base material on which the color image is formed by other unit.

The scanning device 2 is constructed so as to illuminate the original document located on a platen glass 5 with an illuminating lamp 6 and then detect the reflected light from the document by a color sensor 7 at a predetermined resolution (e.g., 16 pixels/mm).

The reflected light image of the document, which is read by the scanning device 2, is supplied to an image processing device 8 as three-color document reflectance data consisting of red (R), green (G), and blue (B) (each 8 bit). In the image processing device 8, predetermined image processing such as shading correction, positional error correction, brightness/color space transformation, gamma correction, frame erasure, color/move edition, etc. are applied to the document reflectance data, and also resultant image data are converted into four-color image data consisting of yellow (Y), magenta (M), cyan (C), and black (K).

The image outputting device 3 capable of forming plural toner images each having a different color is equipped in the color image-forming apparatus 1. This image outputting device 3 has a ROS (Raster Output Scanner) 9 as an image exposing unit, a photosensitive drum 10 as an image carrying body on which an electrostatic latent image is formed, and a rotary type developing device 11 as a developing device capable of forming plural toner images, each having a different color, by developing the electrostatic latent image formed on the photosensitive drum 10.

The image data that are subjected to the predetermined image processing at the image processing device 8 are sent to the ROS 9 as four-color image data consisting of yellow (Y), magenta (M), cyan (C) and black (K) (each 8 bit).

As shown in FIG. 1, the ROS 9 modulates a laser diode 12 in response to the image data. Then, a laser beam LB that is modulated in response to the image data is emitted from this laser diode 12. The laser beam LB emitted from this laser diode 12 is deflected/scanned by a rotating polygonal mirror (not shown), and then scanned/exposed onto the photosensitive drum 10 as the image carrying body via an optical system having a f-θ lens, a reflection mirror, etc.

The photosensitive drum 10 on which the laser beam LB is scanned/exposed by the ROS 9 is rotated/driven by a driving unit (not shown) at a predetermined speed along the arrow direction. Electrostatic latent images are formed on the surface of the photosensitive drum 10 by charging previously the surface thereof up to a predetermined potential by a charger 13 for primary charging to have a predetermined polarity (e.g., negative polarity), and then scanning/exposing the surface thereof by the laser beam LB, which correspond to the respective color of yellow (Y), magenta (M), cyan (C) and black (K), sequentially in response to the image data. The electrostatic latent images formed on the photosensitive drum 10 are reversal-developed by toners, which are charged to have, for example, negative polarity same as the charged polarity of the photosensitive drum 10 by a rotary type developing device 11 that has four-color developers 11Y, 11M, 11C, 11K of yellow (Y), magenta (M), cyan (C) and black (K) to provide toner images T of predetermined colors. In this case, the toner images T formed on the photosensitive drum 10 are charged at a predetermined polarity by a pre-transfer charger (not shown), as the case may be, to adjust the amount of charge.

Each color toner used in the developing device 11 consists of insulating particles containing at least a binding resin and a coloring agent. A typical set of color toners are a cyan toner, a magenta toner, a yellow toner and a black toner. The composition, average grain size, etc. of each color toner may be selected appropriately from a range that does not spoil the object of the present invention.

As a binding resin, the binding resin in a transparent toner described later as the example may be listed. Also, it is preferable that the binding resin should be formed of polyester whose weight-average molecular weight is in a range of 5000 to 12000. The coloring agents are not particularly limited so long as coloring agents are employed normally in the toner. The coloring agents may be selected from cyan pigments or dyes, magenta pigments or dyes, yellow pigments or dyes, and black pigments or dyes, which are well known. Preferably, in order to enhance the effect of providing high gloss, it is important to suppress light scattering at the boundaries between the pigment and the binder. A combination using a coloring agent, in which the pigments having small grain size and disclosed in JP-A-Hei.4-242752 are highly dispersed, is effective.

Also, there is no necessity that the grain size of the color toner should be particularly limited. However, if the necessity such that the color toner should have a function of reproducing faithfully the electrostatic latent image formed by the exposing device is considered, a grain size between 4 μm and 8 μm is preferable.

In the present invention, the color toner that is prepared appropriately may be employed or products available in the market may be employed.

The color toner is used after such color toner is combined with a well-known carrier, which is selected appropriately, to constitute the developer. Also, a mono component developer can be applied.

Respective color toner images being formed sequentially on the photosensitive drum 10 are transferred to lay over one another onto an intermediate transfer belt 14, which is arranged below the photosensitive drum 10 as an intermediate transfer body, by a primary transfer corotron 15 as a primary transfer unit. This intermediate transfer belt 14 is tensioned by fixing end portions thereof to roller members so that the intermediate transfer belt 14 can be rotated/driven at the same moving speed as the peripheral speed of the photosensitive drum 10 along the arrow direction.

Sequential formation of four color images on the photoreceptor and their sequential transfer in resister onto the intermediate transfer belt 14 with use of the primary transfer corotron 15 are carried out. Then, the toner images transferred onto the intermediate transfer belt 14 are transferred onto a recording paper 16 as the base material, which is driven to a secondary transfer position at a predetermined timing, by the pressure and electrostatic force of a back-up roller 17, which supports the intermediate transfer belt 14, and a secondary transfer roller 18, which constitute a part of a secondary transfer unit that is pushed against the back-up roller 17. The recording paper 16 of a predetermined size is fed from the paper-feed cassette (not shown) that is arranged in the color image-forming apparatus 1. Then, as described above, the toner images of predetermined colors are transferred collectively from the intermediate transfer belt 14 to the recording paper 16 by the back-up roller 17 and the secondary transfer roller 18 as the secondary transfer unit.

Also, the recording paper 16 onto which the predetermined color toner images are transferred from the intermediate transfer belt 14 is separated from the intermediate transfer belt 14, and then moved to the gloss-imparting device 4 serving as the fixing device by a carrying device 19.

As the carrying device 19 that carries the base material 16, on which the color image is formed, to the gloss-imparting device 4 serving as the fixing device, any well-known carrying device can be employed. Since it is preferable that the carrying device 19 has a constant carrying speed, for example, either the device that drives the base material while inserting the base material between a pair of rubber rollers that are rotated at a constant rotational speed or the device drives the base material at a constant speed while inserting the base material on the belt that is formed of the rubber, or the like and is stretched around a pair of rollers, one of which is driven by a motor, etc. at a constant speed, may be employed. If the unfixed toner image is formed on the base material, the latter device is preferable from a viewpoint that the toner image is not disturbed.

A gloss-imparting device acting also as a fixing device comprises a transparent toner image-carrying body, a transparent toner image-forming unit, and a heating/pressurizing unit, and a cooling/releasing unit. In such a device, a transparent toner image is formed on the image-carrying body with use of the transparent toner image-forming unit, and then is brought into contact with color toner images on the base material by the heating/pressurizing unit whereby the transparent toner image and color toner images are simultaneously fixed on the base material. Finally, in the cooling/releasing unit the base material on which the transparent and color toners are fixed is cooled and separated from the transparent toner image-carrying body.

Figure 2:
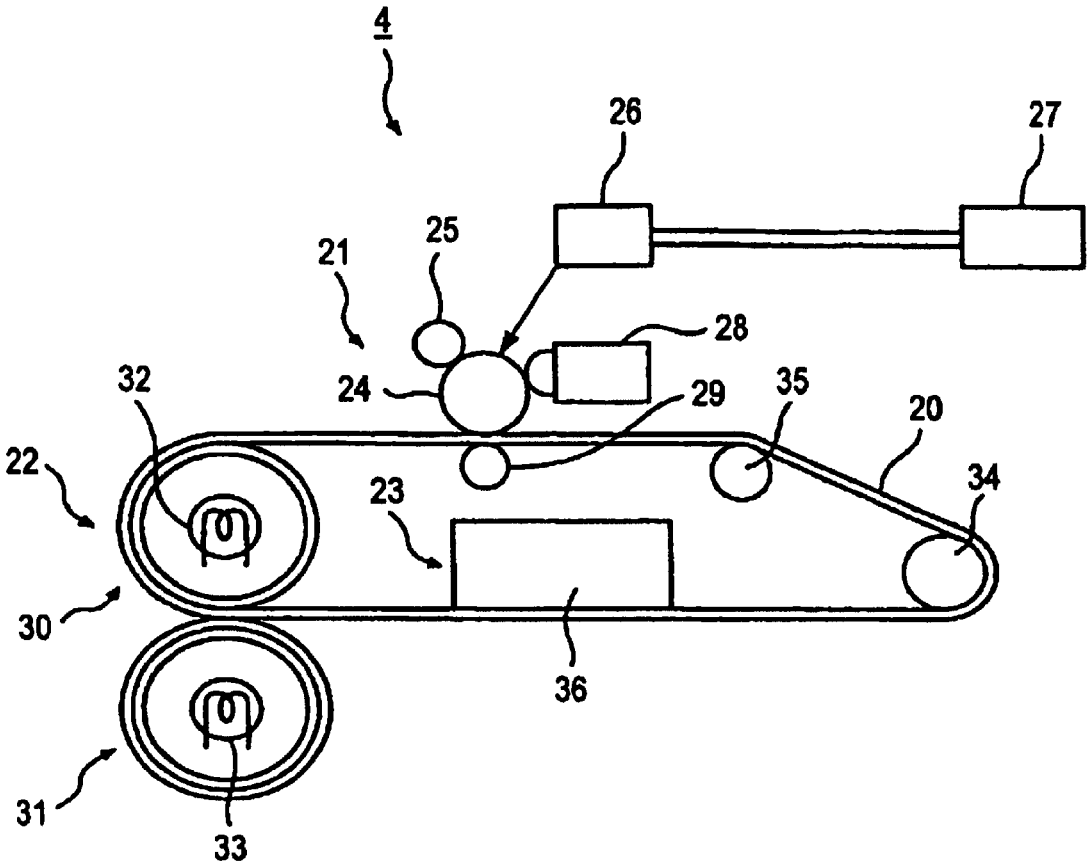
FIG. 2 is a cross-sectional view showing the gloss-imparting device according to the embodiment 1 of the present invention.

FIG. 2 shows the gloss-imparting device 4 that is used in combination with the color image-forming apparatus 1.

The gloss-imparting device 4 is constructed to have a transparent toner image-carrying body 20 such as an endless belt, a transparent toner image-forming unit 21 for forming a desired transparent toner image on the transparent toner image-carrying body 20, a heating/pressurizing unit 22 for heating and pressurizing the desired transparent toner image, which is formed on the transparent toner image-carrying body 20, and the base material 16, on which the color image is formed, to bring them into contact with each other, and a cooling unit 23 for cooling the base material 16 on which the color image is transferred/fixed in a situation that the transparent toner image is coated on a surface of the color image by the heating/pressurizing unit 22.

As the transparent toner image-carrying body 20, the fixing belt that is formed of a polymer film such as polyimide, etc. such as an endless belt is used. Also, in order to consistently form a transparent toner image with a uniform thickness, the transparent toner image-carrying body 20 whose electric resistivity is adjusted to a desirable value by dispersing a conductive additive such as conductive carbon particles, a conductive polymer, etc. is preferable. Though such materials may be fabricated into sheets, it is preferable to employ the transparent toner image-carrying body 20 formed in an endless belt. In addition, from a viewpoint of the release property, it is preferable that the surface of the transparent toner image-carrying body 20 formed into the endless belt should be covered with a silicon resin and/or a fluororesin. Furthermore, from a viewpoint of smoothness, it is preferable that the transparent toner image-carrying body 20 has more than 60 of surface glossiness as measured by a 75-degree gloss-meter.

In addition, the transparent toner image-forming unit 21 forms a transparent toner image containing a thermoplastic resin on the transparent toner image-carrying body 20. An image forming unit having any well-known developing device may be used. As this transparent toner image-forming unit, for example, there is used an apparatus in which a mono component developing unit or a dual component developing unit is disposed so as to face a counter electrode member at a position where the counter electrode member such as a roll, which is earthed or is applied a bias voltage, in contact with the back of the transparent toner image-carrying body and the mono component developing unit or the dual component developing unit directly develops a transparent toner image on the transparent toner image carrying body. It is preferable that when the toner developing device develops an electrostatic latent image (the transparent toner image), a temperature of the transparent toner image-carrying body 20 is less than 60° C. at a position thereon where transparent toner development takes place.

Further, as shown in FIG. 2, the transparent toner image-forming unit 21 preferably has a photosensitive drum 24, a charging device 25 opposed to the photosensitive drum 24, an exposing device 26 made of a ROS, an LED array, or the like for exposing the photosensitive drum 24, a signal forming device 27 for controlling an area in which the transparent toner image is formed on the color image, and the amount of the transparent toner image, a transparent toner image-developing device 28 opposed to the photosensitive drum 24, and a transferring device 29 for transferring the transparent toner image formed on the photosensitive drum 24 onto the transparent toner image-carrying body 20.

Here, no particular limitation is imposed to the photosensitive drum 24. The well-known drum may be employed, or the single-layer structure may be employed, or the multi-layered structure having separate functions may be employed. Also, as a material, inorganic material such as selenium, amorphous silicon, etc. may be employed, or organic material may be employed.

Also, as the charging device 25, for example, the well-known unit such as a contact charger using a conductive or semi-conductive roller, brush, film, rubber blade, etc., a corotron charger, a scorotron charger, etc. using corona discharge, and others may be employed.

In addition, as the exposing device 26, the well-known device such as a laser ROS which consists of a semiconductor laser, a scanning device and an optical system, an LED imager, a halogen lamp, etc. may be employed. In order to develop the transparent toner only at arbitrary areas within a color image, it is preferred to use a laser ROS or an LED array.

As the signal forming device 27, any well-known unit may be employed as far as the transparent toner image can be developed on the base material at the desired position. In this case, as the signal forming device 27, a device for forming the transparent toner image signal based on an image data output from the image processing device 8 may be employed.

In addition, as the transparent toner image-developing device 28, the well-known developing device may be employed irrespective of the mono component developer and the dual component developer as far as such developing device can satisfy the purpose of forming the uniform transparent toner image on the photosensitive drum 24. In the transparent toner image-developing device 28, the transparent toner is used, as described later.

Further, as the transferring device 29, the well-known unit may be employed. For example, a unit for transferring charged particles of the transparent toner by generating the electric field between the photosensitive drum 24 and the transparent toner image-carrying body 20 by using the conductive or semi-conductive roller, brush, film, rubber blade, etc. to which the voltage is applied, a unit for transferring the charged particles of the transparent toner by corona-charging the back surface of the transparent toner image-carrying body 20 by using a corotron charger, a scorotron charger, etc. using a corona discharge, etc. may be employed.

As the heating/pressurizing device 22 serving as the heating/pressurizing unit for heating and pressurizing the transparent toner image-carrying body 20 on which the transparent toner image is formed and the base material 16 on which the color image is formed to bring them into contact with each other, the well-known unit may be employed. As shown in FIG. 2, for example, this heating/pressurizing unit 22 inserts the transparent toner image-carrying body 20 on which the transparent toner image is formed and the base material 16 on which the color image is formed between a pair of rollers 30 and 31 which are driven at a constant speed to carry them and then heat/pressurize them. Here, for example, each surface of one or both of rollers 30, 31, is heated up to temperature at which the transparent toner is melted by providing heat sources 32, 33 at their centers. The two rollers 30, 31 are pushed against mutually. Preferably, a silicon rubber layer or a fluorine rubber layer is provided to the surface of one or both of rollers 30, 31. It is preferable that a length of a nip area that is subjected to the heating/pressurizing is in a range of from about 1 mm to about 8 mm.

The gloss-imparting device 4 will be further explained hereunder. As shown in FIG. 2, the gloss-imparting device 4 has a heating roller 30, the transparent toner image-carrying body 20 such as an endless belt, that is supported rotatably by a plurality of rollers 30, 34, 35 containing the heating roller 30, and the pressurizing roller 31 that is pushed against the heating roller 30 via the transparent toner image-carrying body 20.

As shown in FIG. 2, for example, as the heating roller 30, the roller in which an elastic layer made of the silicon rubber, or the like is coated on a surface of a metallic core made of aluminum to have a predetermined outer diameter may be employed. A halogen lamp 32 is provided within the inside of the heating roller 30 as the heating source, and the heating roller 30 is heated from inside such that the surface temperature of the heating roller 30 is elevated up to a predetermined temperature.

Also, as shown in FIG. 2, for example, as the pressurizing roller 31, the roller in which the elastic layer made of a silicon rubber, or the like is coated on the surface of the metallic core made of aluminum, and then a mold-releasing layer made of a PFA tube, etc. is coated on a surface of the elastic layer to have a predetermined outer diameter may be employed. A halogen lamp 33 is provided to the inside of the pressurizing roller 31 as the heating source, and the pressurizing roller 31 is heated from inside such that the surface temperature of the pressurizing roller 31 is elevated up to a predetermined temperature.

Then, for example, the heating roller 30 and the pressurizing roller 31 are pushed mutually by a pressurizing unit (not shown) via the fixing belt 20 to have a width of the pushing portion (nip portion) and a predetermined load.

In addition, the transparent toner image-carrying body 20 is supported rotatably by a plurality of rollers consisting of the heating roller 30, a releasing roller 34, and a driven roller 35, and is rotated/driven by the heating roller 30, which is rotated/driven by a driving source (not shown), at a predetermined moving speed (e.g., 60 mm/sec). As the transparent toner image-carrying body 20, for example, the member in which a silicon rubber layer of 30 μm thickness is coated on the endless film made of the thermosetting polyimide having a thickness of 80 μm may be employed.

Also, a cooling/releasing heat sink 36 (or a heat pipe) as a cooling/releasing device, which compulsorily cools the transparent toner image-carrying body 20 to release the base material, is provided between the heating roller 30 and the releasing roller 34 on the inner surface side of the transparent toner image-carrying body 20. Thus, the toner and the base material 16 are cooled and released by the cooling/releasing heat sink 36. Also, it is preferable that a unit for inserting a releasing finger between the transparent toner image-carrying body 20 and the base material 16 or a unit for releasing the base material 16 by providing a roller 34 having a small curvature at a releasing position, as shown in FIG. 2, is provided.

Figure 3:
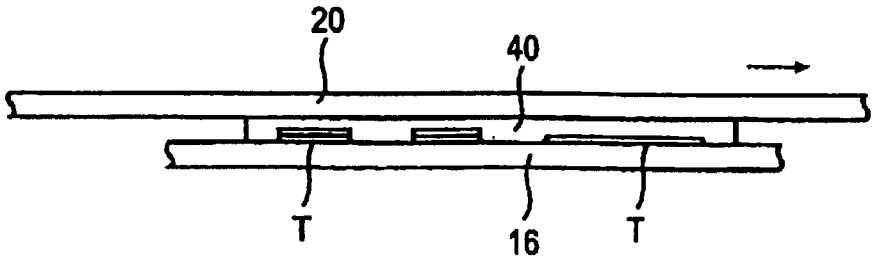
FIG. 3 is cross-sectional view schematically illustrating a color image on which a transparent toner image is overlaid.

Then, as shown in FIG. 2, in the gloss-imparting device 4, the base material 16 onto the surface of which color toner images T are transferred is introduced into a pushing portion (a nip portion) between the heating roller 30 and the pressurizing roller 31, which is pushed against the heating roller 30 via the transparent toner image-carrying body 20, such that the color toner images T are positioned on the heating roller 30 side. Then, as shown in FIG. 3, while the base material 16 is being passed through the pushing portion between the heating roller 30 and the pressurizing roller 31, the color toner images T are heated/melted on the base material 16 and simultaneously a transparent toner image 40 formed on the transparent toner image-carrying body 20 is heated/melted on the surface of the color toner images T and then fused thereon.

Then, for example, the color toner and the transparent toner are heated and melted substantially at temperatures in a range of from about 120° C. to about 130° C. in the pushing portion between the heating roller 30 and the pressurizing roller 31. Then, the base material 16 on which the transparent toner image 40 and the color toner images T are fused is carried together with the transparent toner image-carrying body 20 in a state that the transparent toner image 40 on the surface of the base material 16 contacts tightly to the surface of the transparent toner image-carrying body 20. The transparent toner image-carrying body 20 is cooled compulsorily by the cooling heat sink 36, and thus the transparent toner image 40 and the color toner images T are cooled and solidified and then are released by the releasing roller 34 because of the toughness (rigidity) of the base material.

In this case, after the releasing step is finished, the residual toner, etc. are removed from the surface of the transparent toner image-carrying body 20 by a cleaner (not shown), if necessary, to prepare for the subsequent fixing step.

Meanwhile, the transparent toner used in this embodiment is formulated so as to contain at least a thermoplastic binding resin.

In the present invention, the "transparent toner" means toner particles that do not contain coloring materials (pigment, dye, carbon black, black magnetic powder, etc.) that aim at coloring by using the absorption of light and the scattering of light. Normally the transparent toner in the present invention is colorless and transparent. However, sometimes the transparency thereof is slightly low according to the type and the amount of the fluidizing agent and the mold-releasing agent contained therein. The transparent toner is substantially colorless and transparent.

Also, as the binding resin, any resin may be employed in response to the purpose if such resin is substantially transparent. For example, the well-known resin used in ordinary toners, e.g., polyester resin, polystyrene resin, polyacrylic resin, other vinyl resin, polycarbonate resin, polyamide resin, polyimide resin, epoxy resin, polyurea resin, or the like and copolymers thereof may be mentioned. Since most of toner characteristics such as low-temperature fixing property, fixing strength, storage stability, etc. can be satisfied simultaneously, the polyester resin is preferable among them. Also, it is preferable that such binding resin has a weight-average molecular weight of not less than 5000 and not more than 40000 and the glass transition point of not less than 55° C. and less than 75° C. considering the fixing speed and fixing temperature.

In this case, in the above transparent toner, in order to achieve a high and uniform gloss, it is desired to control the fluidity and the electrostatic property of the transparent toner. From the viewpoint of controlling the fluidity and the electrostatic property of the transparent toner, it is preferable that an inorganic fine grain and/or an organic fine grain is externally added to or adhered onto the surface of the transparent toner.

The above-cited inorganic fine grain is not particularly limited as far as it does not spoil the advantages of the present invention. Such inorganic fine grain can be selected appropriately from the well-known fine grains used as the external additive in response to the purpose. As the material, for example, silica, titanium dioxide, tin oxide, molybdenum oxide, etc. may be used. Also, the inorganic fine grains that are subjected to a hydrophobization process, which is applied to these inorganic fine grains by using a silane coupling agent, a titanium coupling agent, or the like, may be employed with regard to the stabilities such as electrostatic property.

Also, the above-cited organic fine grain is not particularly limited as far as it does not spoil the advantages of the present invention. Such organic fine grain can be selected appropriately from the well-known fine grains used as the external additive in response to the purpose. As the material, for example, polyester resin, polystyrene resin, polyacrylic resin, vinyl resin, polycarbonate resin, polyamide resin, polyimide resin, epoxy resin, polyurea resin, fluororesin, or the like may be mentioned.

It is particularly preferable that the average grain size of the inorganic fine grain or the organic fine grain is in the range of from 0.005 μm to 1 μm. If this average grain size is blow 0.005 μm, aggregation occurs when the inorganic fine grains and/or the organic fine grains are adhered onto the surface of the transparent toner, so that sometimes the desired advantage can not be achieved. In contrast, if the average grain size exceeds 1 μm, it is difficult to get the image with a higher gloss.

In addition, it is desired that the mold-releasing agent such as the wax, or the like should be added to the transparent toner. The composition of the wax is not particularly limited as far as such composition does not damage the advantages of the present invention. Such composition can be selected appropriately from the well-known materials used as the wax in response to the purpose. As the material, for example, polyethylene resin, carnauba natural wax, or the like may be thought of. Here, it is preferable that the wax whose melting point is not less than 80° C. and not more than 110° C. is added to the transparent toner at a rate of not less than 2 wt % and less than 8 wt %. The fluidity of the toner become worse at an ordinary temperature if the melting point of the wax is less than 80° C. whereas melting at the low temperature becomes difficult undesirably if the melting point of the wax is higher than 110° C. Also, the advantages of the present invention are not sufficient if the content of the wax is less than 2 wt %, while the characteristics of the toner such as fluidity, electrostatic property, etc. become worse undesirably if the content of the wax is not less than 8 wt %.

In addition, the grain size of the transparent toner is not particularly limited. For example, the grain size of about 15 μm may be employed.

In this case, the transparent toner is used after such transparent toner is combined with the well-known carrier, which is selected appropriately, to constitute a developer. Also, as the mono component developer, a unit for frictionally charging the toner by a developing sleeve or a charging member to form a charged toner, and then developing the image in response to the electrostatic latent image may be applied.

According to the above configuration, in this embodiment, the image, whose surface is smooth over the entire surface thereof and which has a high gloss not to depend on the image density, can be formed at the high speed not to make the height difference at the boundary between a high density portion and a low density portion prominent in the following manner.

Figure 4:
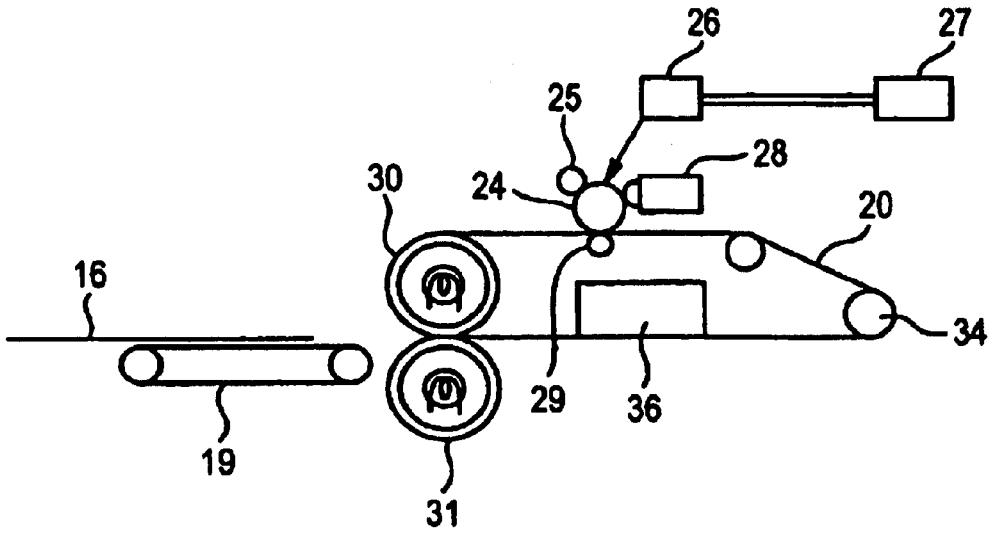
FIG. 4 is a cross-sectional view showing the gloss-imparting device according to the embodiment 1 of the present invention.

In other words, in the color image-forming apparatus 1 to which the gloss-imparting device 4 according to this embodiment is applied as shown in FIG. 1, the unfixed color images T made of color toners of yellow, magenta, cyan, and black colors are formed on the base material 16 such as the recording paper, etc. by electrophotography. Then, as shown in FIG. 4, the base material 16 on which the unfixed color images T made of the color toner are formed is carried into the gloss-imparting device 4 by the carrying device 19.

Figure 5:
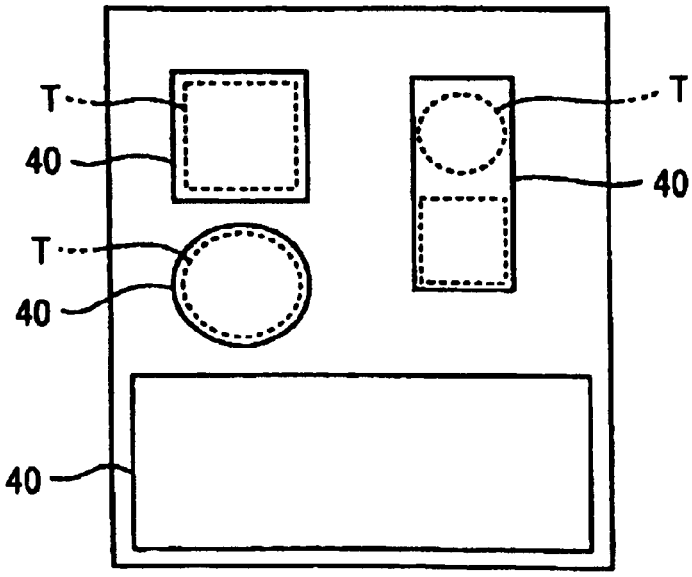
FIG. 5 is a plane view of a color image in which the transparent toner image is coated only at selected portions.
Figure 6A:
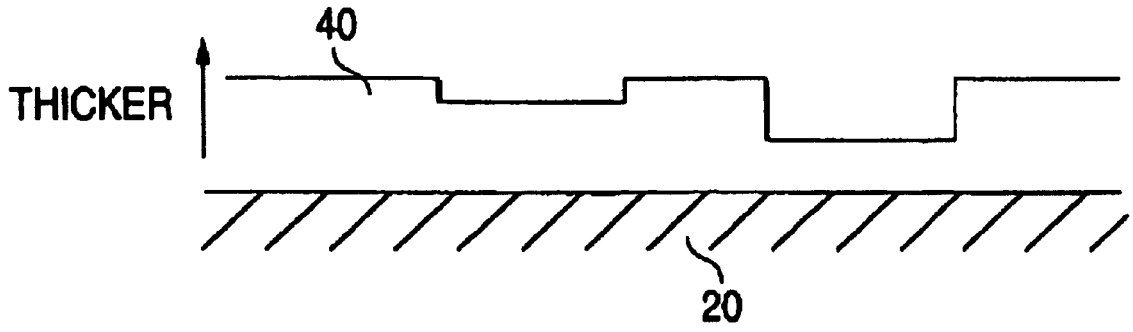
FIG. 6A shows a transparent toner image which is formed on the belt and whose thickness is modulated by the amount of color toners.
Figure 6B:
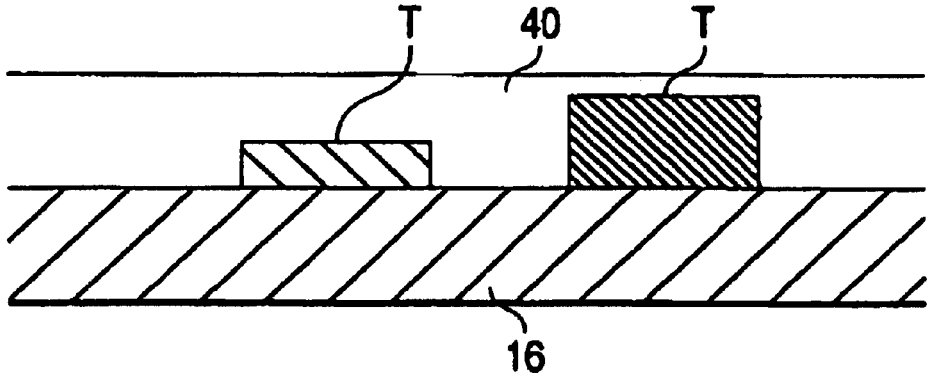
FIG. 6B shows the cross-sectional view of such transparent toner image overlaid on a color toner image.

As shown in FIG. 2, the transparent toner image having a predetermined pattern is formed on the transparent toner image-carrying body 20 in the form of an endless belt. The surface of the photosensitive drum 24 is charged uniformly by charging device 25. Then, the area that corresponds to the transparent toner image 40 is scanned/exposed by the exposing device 26. As shown in FIG. 5, as the transparent toner image 40, the image that is in any pattern such as a rectangle, a circle, etc., which corresponds to the desired color images T, may be employed. Also, as the transparent toner image 40, the image that covers uniformly the entire surface of the base material 16 may be employed. However, as shown in FIG. 6, if the thickness of the transparent toner image is set thin in an area in which the thickness of the toner layer of the color images T is thick and is set thick in an area in which the thickness of the toner layer of the color images T is thin, such thickness of the transparent toner image may be set such that the surface of the transparent toner image becomes substantially smooth consequently. In this case, the shape and the thickness of the transparent toner image are decided based on the image data that are processed by the image processing device.

The electrostatic latent image that corresponds to the transparent toner image, which is formed on the photosensitive drum 24, is developed by the transparent toner image-developing device 28 to provide the transparent toner image 40. This transparent toner image 40 formed on the photosensitive drum 24 is transferred onto the transparent toner image-carrying body 20 by the transferring device 29. The transparent toner image 40 formed on the transparent toner image-carrying body 20 is formed at a predetermined timing in synchronism with the base material 16 on which the color image is formed, and then is moved to the heating and pressurizing position.

As shown in FIG. 2, the transparent toner image 40 formed on the transparent toner image-carrying body 20 is heated and pressurized onto the surface of the base material 16 on which the color images T are formed by the heat and the pressure of the heating roller 30 and the pressurizing roller 31. At that time, as shown in FIG. 3, the color toner of the color images T, which are formed on the base material 16 and consist of the color toner, is melted by the heat and the pressure of the heating roller 30 and the pressurizing roller 31. Then, the color images Tare melted/coated in a situation that the transparent toner image 40 made of the transparent toner is laminated on the surface of the color images having the color toner. Then, the base material is cooled/released and thus the color image can be obtained. In this manner, the image whose surface is smooth over the entire surface of the image and which has a high gloss independent of the image density can be formed at a high speed not to make the height difference at the boundary between the high density portion and the low density portion prominent.

EXAMPLES

Examples of the present invention will be explained with reference to the drawings hereunder. In this case, the present invention is not limited to these examples.

Example 1

Color Toner Developer:

As the color toner developer used in the color image-forming apparatus of the example 1, the cyan developer, the magenta developer, the yellow developer, and the black developer for A Color; manufactured by Fuji Xerox Co., Ltd. were used. The average grain size of these color toners was 7 μm.

Transparent Toner:

A linear polyester (mole ratio=5:4:1, Tg=62° C., Mn=4500, Mw=10000) obtained from terephthalic acid/bisphenol A ethyleneoxide adduct/cyclohexanedimethanol was used as the binding resin. Then, the transparent fine grains of d50=11 μm was manufactured by grinding such binding resin with a jet mill and then classifying the ground resin by an air-type classifier. Two types of the inorganic fine grains A and B to be described later were adhered to the transparent fine grains of 100 wt % by the high-speed mixer.

The inorganic fine grains A were $SiO_2$ (the surface has been subjected to a hydrophobization process with use of a silane coupling agent, the average grain size 0.05 μm, the addition amount 1.0 wt %). The inorganic fine grains B were $TiO_2$ (the surface has been subjected to a hydrophobization process with use of a silane coupling agent, the average grain size 0.02 μm, the refractive index 2.5, the addition amount 1.0 wt %).

The dual component developer was prepared by mixing the toner with the same carrier as the black developer of the color toner.

Color Image-Forming Apparatus:

As the image forming apparatus, the color image-forming apparatus shown in above FIG. 1 was used. The weight ratio of the toner and the carrier, the photoreceptor charged potential, the exposure amount, and the developing bias were adjusted such that the developed amount of the color toner was 0.5 ($mg/cm^2$) at a solid area for every color.

Base Material:

As the base material used in the color image formation, OK special art paper (manufactured by Oji Paper Co., Ltd.) was used.

Development of the Transparent Toner:

As the transparent toner developing device, the dual component developing device was used. The weight ratio of the toner and the carrier, the photoreceptor charged potential, the exposure amount, and the developing bias were adjusted such that the developed amount of the color toner of 1.0 ($mg/cm^2$) can be obtained.

As the transparent toner image-carrying body, the member that is obtained by coating the silicon rubber of 50 μm thickness on the polyimide film of 80 μm thickness, into which the conductive carbon is dispersed, was used.

Also, as the heating/pressurizing rollers, the roller in which a silicon rubber layer of 2 mm thickness is provided onto the core material made of aluminum was used, and a halogen lamp acting as the heat source is arranged at the center of the roller. The surface temperature of both rollers was adjusted to 155° C.

In this case, the fixing speed was set to 60 mm/s. Also, the temperature of the base material at the releasing position was set to 70° C.

The color image formed under the above conditions was evaluated in smoothness, glossiness, etc. as follows.

Smoothness Evaluation:

In order to measure the smoothness of the image surface, the surface roughness meter, Perthometer C5D (manufactured by Perthen) of the process black image, in which cyan, magenta, and yellow image signals are 50% respectively, was used. The ten-point average roughness Rzi (μm) was measured by a stylus having a tip diameter of 2 μm under the measuring conditions that the scanning speed is 0.5 mm/sec, the measured length is 1.0 mm, the measured pitch is 1 μm, and the cutoff is 0.8 mm. Rz1 to Rz50 were measured by repeating this measurement 50 times at the measuring pitch of 5 μm in the direction perpendicular to the scanning direction, and then the average value was designated by Rz(μm). The image analyzing apparatus SAS-2010 (manufactured by Meishin Koki Co., Ltd.) was used to calculate the average value. The evaluation was based on the following criterions.

x . . . the case where Rz is not less than 3 μm

Δ . . . the case where Rz is not less 1.5 μm and less than 3 μm

○ . . . the case where Rz is less than 1.5 μm

Measurement of Glossiness Difference:

In order to measure the glossiness (gloss) of the image, Gloss Meter GM-26D (manufactured by Murakami Color Research Institute) was used. An incident angle of the light into the image was set to 75 degree. As the evaluated images, the image of four types, e.g., the uniform cyan images in which the cyan image signal is set at 10%, 50% and 100%, the process gray image in which the color toner is developed by setting the cyan image signal, the magenta image signal, and the yellow image signal to 50% respectively, the process black image in which the color toner is developed by setting the cyan image signal, the magenta image signal, and the yellow image signal to 100% respectively, and the image in which all image signals of the color toner are set to 0%, were used. Then, the maximum value of the glossiness difference of these images was calculated and then evaluation was made based on the following criterions.

x . . . the case where the glossiness difference is not less than 30

Δ . . . the case where the glossiness difference is not less than 15 and less than 30

○ . . . the case where the glossiness difference is less than 15

Subjective Evaluation of the Image:

The subjective evaluation of the overall image preference was made visual on a portrait. At this time, 20 evaluators were involved in the evaluation, and the five-category evaluation was made as follows.

1. very bad
2. bad
3. normal
4. good
5. very good

Then, the average value was calculated and then evaluated based on following criterions.

x . . . the case where the average value is less than 2

Δ . . . the case where the average value is not less than 2 and less than 4

○ . . . the case where the average value is not less than 4

Also, the evaluation of the toner material used was carried out in the following manner.

Gel permeation chromatography was used to measure the molecular weight. Tetrahydrofuran was used as the solvent.

The average size of toner was measured by using a coulter counter, and the weight average of d50 was applied.

Example 2

An unfixed color toner image was transferred onto the base material by using the same device as Example 1, and then was heated/fixed once by the A Color roller fixing device. Then, the fixed toner image was loaded on the carrying device, and then the transparent toner image was provided by using the same device as Example 1.

Example 3

A color image was formed by using the same device as Example 1 except that the driving speed of the transparent toner image-carrying body was set to 30 mm/s and that the fixing speed and the developing speed of the transparent toner image-developing device were set to 30 mm/s.

Comparative Example 1

An unfixed color toner image was transferred onto the base material by using the same device as Example 1, and then the color image was formed by heating/fixing this toner image by the A Color roller fixing device.

Comparative Example 2

A thermoplastic polyester resin (molecular weight 10000) was coated on the same base material as Example 1 to have a thickness of 15 μm. An unfixed color toner image was transferred onto the base material by using the same device as Example 1, and then the color image was formed by heating/fixing this toner image by the A Color roller fixing device.

FIG. 7 is a table showing the evaluation results of the color images obtained in the Examples 1 to 3 and comparative examples 1, 2. As apparent from FIG. 7, in the case of Example 1, the values of smoothness and the subjective evaluation were good, nevertheless the glossiness difference was slightly large but at the negligible level.

Also, in the case of Example 2, the result of the subjective evaluation was good. However, since the fixing process was applied previously, the smoothness values and the glossiness difference were slightly large but at the negligible level.

Further, in the case of Example 3, the fixing speed was as slow as 30 mm/s, and all the results of the smoothness values, the glossiness difference, and the subjective evaluation were good.

In contrast, in the case of Comparative Example 1 showing a prior art, all the smoothness, the glossiness difference, and the subjective evaluation were poor.

Also, in the case of Comparative Example 2, the base material coated with the transparent resin was used. In this case, both the results of the glossiness difference and the subjective evaluation were very good or good, nevertheless the smoothness was bad since the difference in unevenness of the color toner images appeared on the surface as they are.

As described above, according to the present invention, it is possible to provide a gloss-imparting device capable of forming images, whose surface is smooth over its entire area and which has a high gloss independent of the image density, at the high speed not to make height difference at the boundary between the high density portion and the low density portion prominent, and the color image-forming apparatus using the same.

What is claimed is:

1. A color image forming apparatus for forming a color image with a gloss, the color image forming apparatus comprising:

a color toner image forming unit that forms a color toner image on a base material;

a transparent toner image forming unit that forms a transparent toner image on the color image on the base material;

a heating/pressurizing unit that heats and pressurizes the transparent toner image, the color toner image and the base material; and a cooling unit that cools at least the transparent toner image heated and pressurized by the heating/pressurizing material.

*2. A color image forming apparatus comprising:*

*a color toner image forming device comprising a photoreceptor and a developing unit that forms a color toner image on the photoreceptor, the color toner image being placed on a recording medium;*

*a transparent toner image forming device comprising a photoreceptor and a developing unit that forms a transparent toner image on the photoreceptor, the transparent toner image being placed on the color toner image on the recording medium;*

*a fuser comprising a fixing rotatable body and a pressure rotatable body, at least the fixing rotatable body is provided with a heater; and*

*a cooler located downstream of a nip between the fixing rotatable body and the pressure rotatable body of the fuser in a processing direction of the image formation, the cooler cooling the transparent toner image, color toner image and the recording medium that have been heated and pressurized by the fuser.*

*3. A color image forming apparatus comprising:*

*a color toner image forming device comprising a photoreceptor and a developing unit that forms a color toner image on the photoreceptor, the color toner image being placed on a recording medium;*

*a transparent toner image forming device comprising a photoreceptor and a developing unit that forms a transparent toner image on the photoreceptor, the transparent toner image being placed on the color toner image on the recording medium;*

*a fuser comprising a fixing roller and a pressure roller, at least the fixing roller is provided with a heater; and*

*a cooler located downstream of a nip between the fixing roller and the pressure roller of the fuser in a processing direction of the image formation, the cooler cooling the transparent toner image, color toner image and the recording medium that have been heated and pressurized by the fuser.*

*4. A color image forming apparatus comprising:*

*a color toner image forming device comprising a photoreceptor, a developing unit and an intermediate transfer member, the developing unit forming a color toner image on the photoreceptor, the color toner image being transferred to the intermediate transfer member and further being transferred onto a recording medium;*

*a transparent toner image forming device comprising a photoreceptor, a developing unit and an intermediate transfer member, the developing unit forming a transparent toner image on the photoreceptor, the transparent toner image being transferred to the intermediate transfer member and further being transferred onto the color toner image on the recording medium;*

*a fuser comprising a fixing rotatable body and a pressure rotatable body, at least the fixing rotatable body is provided with a heater; and*

*a cooler located downstream of a nip between the fixing rotatable body and the pressure rotatable body of the fuser in a processing direction of the image formation, the cooler cooling the transparent toner image, color toner image and the recording medium that have been heated and pressurized by the fuser.*

*5. A color image forming apparatus comprising:*

*a color toner image forming device comprising a photoreceptor, a developing unit and an intermediate transfer member, the developing unit forming a color toner image on the photoreceptor, the color toner image being transferred to the intermediate transfer member and further being transferred onto a recording medium;*

*a transparent toner image forming device comprising a photoreceptor, a developing unit and an intermediate transfer member, the developing unit forming a transparent toner image on the photoreceptor, the transparent toner image being transferred to the intermediate transfer member and further being transferred onto the color toner image on the recording medium;*

*a fuser comprising a fixing roller and a pressure roller, at least the fixing roller is provided with a heater; and*

*a cooler located downstream of a nip between the fixing roller and the pressure roller of the fuser in a processing direction of the image formation, the cooler cooling the transparent toner image, color toner image and the recording medium that have been heated and pressurized by the fuser.*

* * * * *